United States Patent Office 2,721,873
Patented Oct. 25, 1955

2,721,873

REACTION OF SILANES WITH UNSATURATED ALIPHATIC COMPOUNDS

Charles A. MacKenzie, New Orleans, La., Leonard Spialter, Dayton, Ohio, and Milton Schoffman, Brooklyn, N. Y., assignors, by direct and mesne assignments, of one-half to Montclair Research Corporation, a corporation of New Jersey, and one-half to Ellis-Foster Company, a corporation of New Jersey No Drawing. Application March 11, 1952,
Serial No. 276,042

41 Claims. (Cl. 260—448.2)

This invention relates to the production of organo silicon derivatives from unsaturated organic compounds, to the products resulting from such methods, to the methods of producing the products, and to the utilization of such derivatives and methods in the production of new compounds, compositions, coatings, etc.

This application is a continuation in part, of application Serial No. 679,856, entitled "Organo Silicon Derivatives from Unsaturated Compounds" filed June 27, 1946, and application Serial No. 737,704 entitled "Organo Silicon Derivatives from Acetylenic Compounds" filed March 27, 1947, now abandoned.

Among the objects of the present invention is the production of polymeric organo silicon derivatives by the reaction of silicon compounds with unsaturated organic compounds.

Other objects include control of the reaction to determine the types of derivatives produced.

Still further objects include the utilization of such derivatives in the production of new materials, compositions, etc.

Still further objects and advantages of the present invention will appear from the more detailed description set forth below, it being understood that such more detailed description is given by way of illustration and explanation only and not by way of limitation since various changes therein may be made by those skilled in the art without departing from the scope and spirit of the present invention.

In accordance with the present invention it has been found that a silicon compound having at least one hydrogen attached to the silicon may be heated in a closed system with an unsaturated organic compound containing the unsaturation in a non-benzenoid group to form an organo silicon compound. While the present invention is particularly concerned with these reactions where one reactant is a silane containing an Si-H linkage and no halogen, these stated reactants may be used in admixture with other silanes including halogen containing silanes, halosilanes containing halogen only attached to silicon, halosilanes containing hydrogen and halogen only attached to silicon, halosilanes containing hydrogen, halogen, and monovalent hydrocarbon groups only attached to silicon; substituted silanes containing hydrogen and monovalent hydrocarbon groups only attached to silicon; and more complex mixtures containing two or more of these states silanes used in admixture with the Si-H non-halgen-containing silanes; and accordingly the general reactions with unsaturated derivatives are disclosed herein also.

Any silicon compound may be employed which contains at least one hydrogen in the molecule attached to a silicon atom including both mono-silicon and poly-silicon derivatives. The silicon compounds thus utilized may be inorganic, i. e., containing no substituent organo groups but may contain substituent inorganic groups such as the halogens, particularly fluorine, chlorine and bromine, these derivatives being represented by silane, monochlorsilane, dichlorsilane, and trichlorsilane (silicochloroform). As representative of the inorganic poly-silicon containing materials, there may be mentioned disilane and disiloxane.

The silane, halogen substituted silanes, disilanes, and disiloxanes, may also contain substituent organic groups, or organo substituted silanes containing no inorganic substituents may be employed as long as there is at least one hydrogen attached to silicon. In any of these compounds the organic group present may be one or more aliphatic, carbocyclic, alicyclic, or heterocyclic groups. Thus alkyl and aryl substituted silanes which may or may not also include halogens, e. g. fluorine, chlorine, and bromine, may be utilized. Exemplifying such derivatives there may be mentioned butyldichlorosilane, diethylchlorosilane, trimethylsilane or tributylsilane.

The silicon derivatives having at least one hydrogen attached to the silicon may also include oxygen-containing compounds, particularly organo substituted oxygen-containing compounds and organo substituted oxygen- and halogen-containing compounds, as well as their thio derivatives exemplified, for example, by alkoxy, thio-alkoxy, aryloxy, and thioaryloxy-silanes, such as triethoxysilane or trithiophenoxysilane.

Other oxygen-containing derivatives include the acyloxysilanes, particularly where produced from or containing carboxyl acyl groups, for example, triacetoxysilane, and diacetoxysilane, exemplifying particularly the acyl groups from fatty acids.

The silicon derivatives containing at least one hydrogen attached to the silicon may also include nitrogen, such as compounds containing the N–Si linkage where the nitrogen is an amino or imino or substituted amino or imino group, or a silazane, such compounds including N-diethyl-aminodimethylsilane and symdiethyl-disilazane, and such derivatives may further be substituted by halogen and oxygen-containing groups.

Insofar as the silicon derivatives are concerned, they will be illustrated below in examples utilizing silicochloroform and other silane derivatives.

A wide variety of unsaturated organic compounds containing the unsaturation in a non-benzenoid group may be utilized in the reaction, such unsaturated compounds and mixtures thereof including an ethylenic or acetylenic linkage. Thus there are included olefins, diolefins, and acetylenes, and their derivatives, particularly where the derivatives include substitutents such as halogen, for example, fluorine, chlorine and bromine, alkyl or other aliphatic groups, aryl or other carbocyclic groups, un-saturated alicyclic groups such as the cyclo-olefins, and other types of substituent groups including, for example, nitrile, or nitro groups. Thus the unsaturated organic compound containing the unsaturation in a non-benzenoid group includes unsaturated hydrocarbons, aliphatic, carbocyclic, alicyclic and heterocyclic compounds, including unsaturated alcohols, aldehydes, ketones, quinones, acids, acid anhydrides, esters, nitriles, or nitro compounds.

The olefins and substituted olefins where the substituent group is halogen, e. g. fluorine, chlorine or bromine, alkyl, aryl or cyclo-paraffin, as set forth above, include for example, the olefins ethene, propene, butene or pentene. Diolefins and their substituted derivatives include butadiene, chloroprene, cyclopentadiene, divinyl-benzene or cyclohexadiene. Cycloolefins are also included as well as acetylene or phenylacetylene. As further illustrating the unsaturated derivatives that may be employed, there may be mentioned styrene, ethylvinyl benzene, halogen substituted styrenes, allyl chloride, allyl benzene, vinyl chloride, vinylidine chloride, tetra-fluoroethylene, indene, stilbene, furan exemplary of heterocyclic compounds containing unsaturated groups, or cyclohexene.

Other types of derivatives illustrating the unsaturated material include allyl ethers, vinyl ethers, nitro-olefins, allyl esters, vinyl esters, esters of acrylic and methacrylic acids, vinyl carbazole, acrolein, ketene, quinone, esters of cinnamic and crotonic acids, esters of maleic acid, particularly diallyl maleate, esters of fumaric acid, maleic anhydride, vinylnaphthalene, and acrylonitrile.

In general, the reaction involves the addition of the hydrogen and silicon of a silane to the unsaturated portion of the other reactant molecule. The reaction may be illustrated, for example, by using ethylene and trichlorosilane as the reactants as follows:

$$CH_2=CH_2 + HSiCl_3 \rightarrow CH_3CH_2SiCl_3$$

In carrying out such reactions a single compound is not produced in most cases, as for example, in this particular case compounds in addition to ethyltrichlorosilane are formed. For example, there have been isolated from the reaction mixture ethyltrichlorosilane, butyltrichlorosilane, hexyltrichlorosilane, octyltrichlorosilane, and decyltrichlorosilane. The ratio of the amounts of these various materials present varies with changes in experimental conditions, principally with changes in temperature and pressure. In general the compounds produced contain an even number of carbon atoms in the organic radical which may be expected if the reaction is considered as proceeding through the combination of ethylene groups.

By employing temperatures and pressures favorable for decomposition of the products, it is possible to isolate appreciable quantities of lower derivatives obtained by degradation of the higher derivatives utilized. Thus in the reaction employing ethylene and silicochloroform, under chosen conditions to produce degradation of the reaction product, such as a temperature of 290° C., and a pressure of at least 1000 pounds per square inch measured at room temperature, methyltrichlorosilane may be isolated from the reaction mixture. There may also be formed as in such cases, a considerable quantity of carbonaceous material and gaseous products.

As further illustrating the invention, using styrene and silicochloroform as the reactants, addition products are produced which include addition products formed in the ratio of 1 mol of styrene to 1 mol of trichlorosilane, and 2 mols of styrene to 1 mol of trichlorosilane. Thus there may be produced phenylethyltrichlorosilane $$C_6H_5CH_2CH_2SiCl_3$$

as well as $$C_6H_5CH(SiCl_3)Ch_3$$

In the case of the 2:1 reaction product, there may be produced $$C_6H_5CH_2CH_2CH(C_6H_5)CH_2SiCl_3$$

although it is also possible that a second derivative having the formula set forth below is present:

$$C_6H_5CH_2CH_2CH_2CH(C_6H_5)(SiCl_3)$$

Both 1:1 and 2:1 reaction products have been isolated from the reaction mixture.

Referring now to those cases where the unsaturated organic compound utilized in the addition reaction with the silicon derivative is one containing an acetylene group, the latter compound may be generally formulated as $R_1C\equiv CR_2$, in which $R_1$ and $R_2$ may be the same or different groups selected from such groups as hydrogen, aliphatic groups including the alkyl groups and olefinyl or alkylene groups, carbocyclic groups including the aryl groups for example, cyclo-alphatic groups such as cyclohexyl or oxy groups such as $OR^3$, where $R^3$ is hydrogen, alkyl or aryl, as set forth above. As exemplary of such compounds there may be mentioned acetylene, vinyl acetylene (acetylene dimer), pentine-1, hexine-1, ethyl propyl acetylene ($C_3H_7C\equiv CC_2H_5$), or phenyl acetylene.

The reaction involves the addition of the hydrogen and silicon compound of the silane to the unsaturated portion of the organic compound containing the acetylene group. The direction of addition to the triple bond generally is in the direction of the silicon atom attaching itself to the most negative carbon or to the carbon containing the greater number of hydrogen atoms, but addition in both directions may take place particularly if substituent groups on the carbon atoms of the triple bond are closely alike in negativity, as for example, where the acetylene derivative employed is propyl ethyl acetylene ($C_3H_7C\equiv CC_2H_5$). Thus formulating the addition in the case of 1:1 additions we have

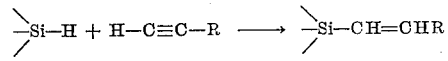

or in some cases

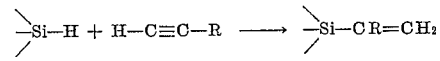

and in some instance, of course, mixtures of these two types of derivatives will be produced but not necessarily in equal amounts depending on the nature of the substituent group R and the nature of the organo-silicon derivatives employed.

In carrying out these reactions in general, a single derivative or addition compound is not produced although the reaction may be carried out in such a way as to give a single type of derivative as the greatest amount of the product obtained. Nor is the addition limited to a 1:1 addition since a 2:1 addition such as 2 mols of the acetylene derivative to 1 of the silane may take place. Furthermore it must be kept in mind that silicon derivatives containing a hydrogen to silicon bond also add to double bonds such as those present in vinyl derivatives and because of the fact that the highly desirable vinyl silicon compounds are obtained in accordance with the present invention from acetylene and its derivatives and compounds containing hydrogen to the silicon bonds, further reactions of such vinyl groups with the silicon derivatives may take place thus producing very complex reaction products. In such further reaction there may be formulated the following

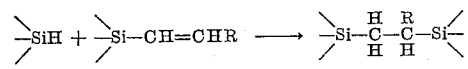

Isolation of addition products of 2 moles of alkyne to 1 of silicochloroform, for example, have actually been done as illustrated in one of the examples given below. The structure of products obtained under the possibility of such complex reactions as those set forth have not been fully evaluated. Mixtures of derivatives are obtained. Reactions and structures which illustrate what takes place include the following in the case of acetylene used for exemplary purposes a)

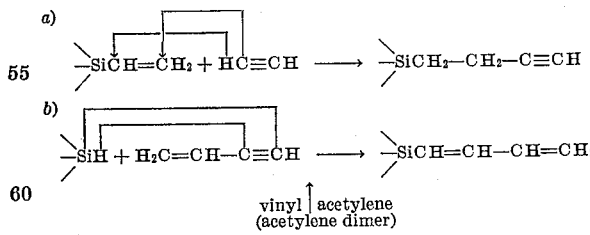

b)

In general, the initial addition compound which is formed and may be isolated, when using an acetylenic compound according to the present invention, may be formulated as follows:

$$R^1{}_xR^2{}_yR^3{}_{4-x-y-z}Si(CR^4=CHR^5)_z$$

in which $R^1$, $R^2$ and $R^3$ may be halogen of atomic weight less than 90, hydrogen, or a hydrocarbon radical e. g. aliphatic including alkyls and olefinyls, or carbocyclic including aryl, alkaryl, and aralkyl, or cycloaliphatics e. g. cyclohexyl, or a substituted oxy group such as OR or a substituted amino group e. g. NHR or $NR_2$ in which R may have any of the radical values just mentioned above or may be an acyl radical; $R^4$ and $R^5$ may be hydrogen, or a hydrocarbon radical, or a substituted oxy or substituted amino group of the significance referred to above, the sum of $x$ and $y$ is from 0 to 3, $z$ is from 4 to 1, and the sum of $x$, $y$, and $z$ must not exceed 4. Any of the compounds covered in the formulation given immediately above can be produced by this invention including those where $R^1$ is chlorine and $x$ is 3, and $R^5$ is a hydrocarbon radical, where $R^1$ is chlorine and $x$ is 2 and $z$ is 2, and at least one $R^5$ is a hydrocarbon radical, and where $R^1$ is ethyl, $x$ is 3, and $z$ is 1, and $R^5$ is a hydrocarbon radical.

Thus in the case where a single vinyl group is formed the compounds may be formulated as $$R^1R^2R^3Si—CR^4=CHR^5$$

where $R^1$, $R^2$, $R^3$, $R^4$ and $R^5$ have the significance set forth above.

Where the compound produced has hydrogen remaining attached to silicon the compound may be generally formulated as $$R^1{}_xR^2{}_yH_{4-x-y-z}Si(CR^4=CHR^5)_z$$

where $R^1$, $R^2$, $R^4$ and $R^5$ have the values set forth above, the sum of $x$ and $y$ is from 0 to 2 and $z$ is from 3 to 1, and the sum of $x$, $y$ and $z$ must not exceed 4.

Where a mono-substituted acetylene is utilized, the silico-organic compound initialy produced may be generally formulated:

$$R^1{}_xR^2{}_yR^3{}_{4-x-y-z}Si(CH=CHR^5)_z$$

where the groups have the significance set forth above, the sum of $x$ and $y$ is from 0 to 3, $z$ is from 4 to 1, and the sum of $x$, $y$ and $z$ must not exceed 4. In the case of silichloroform reacted with a mono-substituted acetylene the initial compounds will have the general formulation:

$$Cl_3Si—CH=CHR^5$$

where $R^5$ has the significance set forth above.

The temperautre and pressure conditions under which the reactants are caused to react depend on the particular materials being reacted as well as the ultimate products sought. The temperature should be high enough to produce substantial reaction with the materials utilized and generally will be above 50° C. but such temperatures are necessarily dependent to some extent at least on the catalysts and pressures employed. The pressures utilized are superatmospheric and may run as high as 4500 pounds per square inch and higher, again depending on the particular materials employed and the nature of the reaction being carried out. Desirably the reaction may be carried out in a closed vessel such as a superpressure bomb of the type commonly employed in high pressure hydrogenations and the pressures obtained will depend on the particular materials utilized in the reaction as well as the temperatures employed. In some cases higher pressures enable operations to be carried out at temperatures lower than those which are utilizable when lower pressures are employed. Overall temperature ranges will run from 50° C. to 450° C. or 500° C. Where equipment such as a superpressure bomb is employed, pressures not less than the vapor pressure of the components of the mixture will be produced at the reaction temperature. Thus mixtures which are entirely liquid at room temperature such as styrene and silicochloroform for example, result in operating under relatively low pressures, i. e. pressures due to the vapor presusre of the components; whereas when gases like ethylene are employed, the higher pressures up to and above 4500 pounds per square inch will be obtained.

The presence of added catalysts of the addition type are not essential but the walls of the bomb reaction chamber may itself act sufficiently as a catalyst. This is particularly true in connection with reactions involving silicochloroform and related chlorsilanes. However, addition catalysts may be employed under certain conditions to facilitate reaction or increase yields. Some of these may be selected, for example, from compounds and salts of the elements in groups IIIA, IVA, IB, and IIB of the periodic system. The group VIII metals and some of their compounds may also successfully be used. Utilizing a bomb of the type referred to above with replaceable liners, such liners may be metallic such as copper which in some instances at least may have a catalytic effect, or the liner may be a glass liner.

Other types of addition catalysts may be utilized including peroxides e. g. acetyl peroxide, benzoyl peroxide, peracetic acid, or perbenzoic acid. Such catalysts may also influence the direction of addition which takes place, as for example, whether the silicon atom attaches to the most negative carbon, or to a less negative carbon. The presence of solvents may also have an influence in the direction of such addition as where the silicon derivative used is a solvent for the acetylene compound employed. The peroxides and similar catalysts probably involve a rapid chain reaction which exercises the stated influence on the direction of addition. While the peroxides are catalysts, nevertheless the amount of peroxide present may in some cases affect the relative amounts of the two types of addition products present. In such cases control of the amount of the product produced due to the presence of the catalyst may be exercised. The action of such catalysts may not always be the same where the halogen derivatives employed differ, that is, the catalyst effect may be different depending on whether the halogen present is chlorine, bromine or fluorine.

Inert gases such as nitrogen, or ethane may be introduced to increase the pressure in the vessel or inert liquids volatile at the temperatures employed such as cyclohexane or pentane, may be utilized to build up pressures in the reaction chamber, or inert diluents, particularly organic liquids may be present to control the reaction taking place, and combinations of any of these expedients may also be utilized as desired.

While the reaction referred to above has been illustrated by reacting of a single organo unsaturated compound with a single silicon compound containing at least one hydrogen attached to the silicon, mixtures of unsaturated compounds may be reacted with a single such silicon derivative or a single unsaturated compound may be reacted with mixtures of the silicon derivatives, or mixtures of unsaturated compounds may be reacted with mixtures of silicon derivatives to produce very complex reaction products.

Thus the silicon derivative employed need not be a single individual compound, but mixtures of two or more of any of the silicon derivatives set forth above may be utilized. For example, a mixture containing silane with one or more of the chlor silanes such as mono, di, tri, or tetra chlor silane, or all of them, or a mixture of two or more of these chlorsilanes without silane itself, may be used. Of course, the complexity of the products obtained increases with the complexity of such mixed reactants, and more so if degradation conditions are utilized.

As exemplified in the examples, the pressure employed may be anywhere from somewhat above normal atmospheric pressure to very substantial pressures, as for example, 4500 pounds per square inch and higher. Inert gases such as nitrogen may be introduced to increase the pressure in the vessel or inert liquids volatile at the temperatures employed may be utilized to build up pressures in the reaction chamber, or inert diluents, particularly organic liquids, may be present to control the reaction taking place.

The reactions may be carried out in at least two separate stages and/or the unsaturated compound or the silicon compound or mixtures of unsaturated compounds or mixtures of silicon compounds or mixtures of unsaturated compounds and silicon compounds are introduced before each heating stage. This type of process is particularly useful with mixed silicon derivatives, where completed reaction is not obtained in the first stage, or to modify the products of the first stage. In such multi-stage reactions the operating conditions may be the same or different in the successive stages, for example, the temperature and/or pressure may be the same or higher or lower in the successive stages, and one or more of the stages may include the conditions for degradation.

New types of derivatives may readily be produced by carrying out the reactions set forth herein. From the olefin reactions, such derivatives include, for example, the higher alkyl silanes and silicon halides and particularly, addition products of a silicon derivative having at least one hydrogen attached to silicon with an unsaturated ali-organic compound having more than 4 carbon atoms, the term ali-organic compound being utilized herein to cover both aliphatic and alicyclic compounds. Thus as shown in the examples, new alkyl derivatives may be produced containing different substituent alkyl groups, one of which at least contains three or four or more carbon atoms, for example butyl ethyl dichlorosilane and tributyl ethylsilane. As indicated in some of the examples, complex mixtures of derivatives are produced, for example, complex mixtures of alkyl silicon halides containing ethyl, butyl, hexyl, octyl, and decyl derivatives. In utilizing the organo silicon halides produced by the addition reaction, it is not necessary to segregate individual derivatives from the reaction mixture before hydrolysis, but the complex mixtures themselves may be subjected to hydrolysis and such hydrolysis reactions either of the individual compounds or mixtures may be carried out in any desirable way, as for example, by pouring the mixed derivatives desirably in the presence of ether onto ice water mixtures or ice alone to produce the hydrolysis. Such silicone compounds thus produced will depend on the nature of the original material subjected to hydrolysis.

From the acetylenic reactions, as exemplary of initial products produced by the present invention there may be mentioned: illustratively, vinyl dichlorosilane, vinyl monochlorosilane, divinyl monochlorosilane, divinyl dichlorosilane, trivinyl chlorosilane, methyl ethyl vinyl chlorosilane (obtainable from methyl ethyl chlorosilane and acetylene), vinyl triethyl silane, pentenyl trichlorosilanes, hexenyl trichlorosilane, dipentenyl propyl ethoxy silanes (from propyl ethoxy silane and two molecules of 1-pentine), beta styryl diethyl N-dimethylaminosilane (from diethyl N-dimethylaminosilane and phenyl acetylene), the specific derivatives set forth immediately above where bromine or fluorine replaces chlorine in entirety or partially, where other alkyl or other aliphatic groups such as methyl, ethyl, propyl, isopropyl, butyl, isobutyl, pentyl or amyl, hexyl, heptyl, octyl, nonyl, decyl, dodecyl, allyl, methallyl, etc. replace the alkyl groups wholly or in part, where phenyl replaces the alkyl groups, etc.

The vinyl silicon derivatives obtained are valuable compounds utilizable in the production of other derivatives, in the production of hydrolysis products, or polymerization products. As stated above in the reactions particularly where long chain substituted acetylene derivatives are employed, complex reaction products are also produced and polymerization products are also formed along with monomeric derivatives in the carrying out of the reaction at elevated temperatures and under superatmospheric pressure. Thus generally polymerization products will be present in the bomb in which the reactions are carried out as set forth above and illustrated in the examples given below. The vinyl monomers derivatives produced in accordance with this invention may be subjected to polymerization as by heat treatment particularly under superatmospheric pressures at elevated temperatures in the presence or absence of catalysts and the polymerization products produced are generally complex rather than individual polymers.

The halogen-containing vinyl silicon derivatives such as the olefinyl silicon chlorides may be subjected to hydrolysis, as for example, by treatment with water to produce silicones or silicols or mixtures of such derivatives depending on the halides subjected to hydrolysis, which cure more rapidly than corresponding saturated alkyl derivatives due to the unsaturation present. Such compounds which are subjected to hydrolysis may have the formula $$R^1{}_xR^2{}_yM_{4-x-y-z}Si(CR^4{=}CHR^5)_z$$

where $R^1$, $R^2$, $R^4$ and $R^5$ are selected from the group consisting of hydrogen, hydrocarbon radicals, substituted oxy and substituted amino groups all as explained above, M is halogen of atomic weight less than 90, the sum of $x+y$ is from 0 to 2, $z$ is from 3 to 1, and $x+y+z$ is not greater than 3, treated with water to hydrolyze the same. The hydrolysis may be carried out in any desirable way as for example, by dissolving the reaction product, from the pressure reaction or individual components thereof in ether and treating such solution with cold water. Or the hydrolysis may be carried out by utilizing a solution of the silicon derivative in a ketone such as methyl ethyl ketone, dimethyl ketone, methyl propyl ketone, methyl isopropyl ketone, etc., and adding such solution to cold water for example, at temperatures relatively low for example, in the neighborhood of 0° C. to produce hydrolytic products. The silicols or silicones or mixtures of silicols and silicones produced in such hydrolytic reactions may be utilized for the production of films by applying them to articles and evaporating off the solvent to produce a film of the silicon derivative which then may be cured by heat treatment at elevated temperatures to produce tough flexible films. In utilizing the organo silicon halides produced by the addition reaction, it is not necessary to segregate individual derivatives from the reaction mixture before hydrolysis, but the complex mixtures themselves may be subjected to hydrolysis and such hydrolysis reactions either of the individual compounds or mixtures may be carried out in any desirable way, as pointed out above.

The hydrolyzed products as well as the derivatives before hydrolysis may be utilized in a variety of ways, as for example, in the production of coating compositions either utilized by themselves or in combinations including solvents and diluents, such as hydrocarbon solvents, both aliphatic and aromatic, such as hexane, benzene, toluene, ethers such as dimethyl, diethyl, diisopropyl, dibutyl ethers and cyclic ethers, such as dioxan, or diethers such as diethyl ether of ethylene glycol or mixed ethers, esters such as ethyl, butyl or amyl acetates, propionates or butyrates. When the use of a solvent is desired it is sometimes advantageous to add the solvent to the reaction mixture before it is poured on ice when hydrolysis is being carried out.

The liquid products or solutions of the products may be utilized as lacquers, varnishes, impregnating compositions, coating compositions, or for the impregnation of fillers for hot pressing operations, etc. Or solutions of the reaction products may be utilized for storage purposes to preserve the materials for future use.

While solutions as set forth above may be utilized in the production of molding compositions, liquid materials themselves or in other ways may be utilized to impregnate organic or inorganic fillers with the polymerized or partially polymerized or original reaction mixtures and utilized for molding purposes, as for example, in hot pressing operations. Fillers for these purposes may include inorganic materials such as mica, clays, asbestos, or organic fillers including cellulose products, such as wood or wood fibers, cellulose fibers of various types, paper, etc.

The materials may be utilized in the production of varnishes or coatings for electrical insulation, as dielectric liquids, etc. They may also be employed in the production of laminated products for bonding together two or more sheets of the same or different organic or inorganic materials.

In their utilization for any of the purposes set forth above or for other utilities, they may be blended with other components, such as natural resins including rosins, copal or shellac, as well as synthetic resins including urea aldehyde, specifically urea formaldehyde, phenol aldehyde, melamine aldehyde, aniline aldehyde, acetone formaldehyde, alkyd, or cumaron-indene, resins, vinyl resins, polymerized vinyl derivatives, allyl dibasic acid resins, acrylate and methacrylate resins, and with various cellulose derivatives including the ethers and esters, such as nitro-cellulose and the organic esters of cellulose such as cellulose acetate, as well as with drying, semi-drying and non-drying oils.

They may be utilized in lubricating oils, or as additives to hydrocarbon oils for lubricating purposes, and for inclusion with the vegetable oils, particularly the drying oils such as linseed oil and China-wood oil, and the semi-drying oils such as soya bean oil, as well as non-drying oils including castor oil. With the vegetable or other glyceride oils they may be blended as by cooking.

The following examples will illustrate the invention, parts being by weight unless otherwise indicated.

In the first example there is described the action of trichlorosilane on ethylene.

*Example 1.*—One-half mole of trichlorosilane was placed in the bomb. Ethylene was then introduced until the pressure at room temperature was 500 pounds per square inch. A temperature of 300–320° C. was used for 4½ hours. The highest pressure reached was 1250 pounds per square inch. When the pressure had dropped to 675 pounds per square inch, the heating element was shut off and the bomb was allowed to cool to room temperature. At room temperature, the pressure reading was 175 pounds per square inch.

There was obtained from the bomb 75.5 grams of a clear orange liquid (showing a green fluorescence). Fractionation of 74.0 grams of this mixture yielded the following products:

4 grams boiling under 97° C.—Mainly trichlorosilane.
31.5 grams boiling 98–100° C.—Ethyltrichlorosilane.
19.5 grams boiling 147–149° C.—Butyltrichlorosilane.
7.0 grams boiling 190° C.—Hexyltrichlorosilane.
4.5 grams boiling 150–165° C., at 32 mm.—A mixture octyl- and decyltrichlorosilane.

All the compounds were identified by determination of neutral equivalents and molecular weights.

A small sample of the mixture before fractionation was dissolved in ether and hydrolyzed by pouring on ice. A polymeric silicone product was obtained in this way.

The reaction of silicochloroform with ethylene under varying temperature conditions is illustrated in the next example.

*Example 2.*—One-half mole of trichlorosilane was placed in the bomb. Ethylene was introduced until the pressure at room temperature remained constant at 500 pounds per square inch. When the temperature was held at 270–388° C. for 8 hours, reaction took place and when the bomb was cooled to room temperature, the pressure was found to have dropped 225 pounds per square inch. Fractionation of the reaction mixture gave the same materials, in approximately the same ratio, described in Example 1.

The next example describes the action of trichlorosilane on ethylene, employing conditions favorable for a degradation reaction to occur.

*Example 3.*—One mole of trichlorosilane was placed in the bomb. Ethylene was then introduced until, at room temperature, a constant pressure of 1000 pounds per square inch was obtained. The shaking mechanism of the bomb was started and the temperature was raised to the neighborhood of 300° C. At 290° C. an explosion occurred within the bomb. When the bomb was cooled to room temperature, it was found to contain considerable gas pressure. There was about 96 grams of carbonaceous material. When this was extracted with ether, there was obtained 20 grams of a liquid boiling at 65° C. Determination of the neutral equivalent and molecular weight of this product showed it to be methyltrichlorosilane.

In the next experiment, there is described the action of trichlorosilane on styrene.

*Example 4.*—Equimolecular parts by weight of trichlorosilane and styrene were placed in the bomb. The bomb was sealed and heated for 2 hours at 350–380° C. After cooling the bomb, there was obtained 53 grams of a liquid. 15 grams of the mixture had a boiling point of 255–256° C. Determination of the neutral equivalent and the molecular weight showed the compound to be the addition product of silicochloroform and styrene in a molecular ratio of 1:1. The formula of the compound probably is $$C_6H_5CH_2CH_2SiCl_3$$

3½ grams of a second product boiling 250–265° C. at 18 mm. was isolated. Determination of the neutral equivalent and molecular weight showed that the compound had been formed from styrene and silicochloroform in a molar ration of 2:1. The formula of the compound probably is

Each of the above products may be hydrolyzed and condensed by common processes to give polymeric silicon products. The original mixture may also be hydrolyzed and condensed to give polymeric silicon products.

The next example describes the action of trichlorosilane on allyl chloride.

*Example 5.*—Equimolecular parts by weight of trichlorosilane and allyl chloride were placed in the bomb. The bomb was sealed and heated, with shaking, for 4 hours at 300° C. After cooling the bomb the liquid mixture was removed. Some unchanged trichlorosilane was removed by distillation. The rather viscous residue was diluted with ether and then hydrolyzed by pouring on ice. The ether layer was separated and a film of it was put on a glass plate. When the ether had evaporated there remained a clear, non-tacky, hard film. When a portion of the film was burned and the residue ignited, silica was deposited.

The next example describes the action of trichlorosilane on pentene.

*Example 6.*—Equimolecular parts by weight of trichlorosilane and pentene (mainly 2-pentene) were placed in the bomb provided with a copper liner. The bomb was shaken for 4 hours at 300° C. After cooling the apparatus there was obtained 48.4 grams of a clear yellow liquid. Fractionation of the mixture gave 9.5 grams of a production boiling 163–164° C.

*Analytical data*

Neutral equivalent calc. for $C_5H_{11}SiCl_3$: 68.5. Found: 68.3.

Mol. wt. calc.: 206. Found: 206.

The next example describes the action of trichlorosilane on pentene in the presence of nitrogen.

*Example 7.*—The air in the reactor was replaced with nitrogen. A mixture of equimolecular parts by weight of trichlorosilane and pentene (mainly 2 pentene) were placed in the bomb provided with a copper liner. The bomb was closed and nitrogen was run in until a gauge pressure of 1600 pounds per square inch was obtained. The reactor was then shaken for 4 hours at 300° C. After cooling the apparatus there was obtained 59 grams of a clear yellow liquid. Fractionation of this mixture produced 21 grams of amyl trichlorosilane b. 163–164° C.

A small sample of the unfractionated material was diluted with ether and hydrolyzed by pouring on cracked ice. When a film was poured on a glass plate and then heated for 2 hours at 120° C. a clear hard film was obtained.

The next example describes the preparation of amyltrichlorosilane by the action of trichlorosilane on pentene.

*Example 8.*—A mixture of equimolecular parts by weight of trichlorosilane and pentene (mainly 2 pentene) were placed in the reactor, the latter being provided with a glass liner. The mixture was heated, with shaking, for 4 hours at 300° C. After cooling, there was obtained from the reactor, 60 grams of a clear yellow liquid. Fractionation of the product yielded 26.5 grams of amyltrichlorosilane b. 163–164° C.

The next example describes the preparation of cyclohexyltrichlorosilane from trichlorosilane and cyclohexene.

*Example 9.*—A mixture of equimolecular parts by weight of cyclohexene and trichlorosilane was placed in the reactor, provided with a glass liner. The mixture was heated, with shaking, for 4 hours at 325° C. After cooling the reactor there was obtained from it 91 grams of a clear orange liquid. Fractionation of this liquid gave 52 grams of a product boiling 205–206° C.

*Analytical data*

Neutral equivalent calc. for cyclohexyltrichlorosilane: 72. Found: 77.
Mol. wt. calc.: 217. Found: 212.

A small sample of the unfractionated material was diluted with ether and hydrolyzed. A film of the ether solution was put on a glass plate and heated at 120° C. for 3 hours. A clear hard film was obtained.

The next example describes the action of trichlorosilane on isoprene.

*Example 10.*—A mixture of equimolecular parts by weight of isoprene and trichlorosilane was placed in the reactor. The mixture was heated, with shaking, for 4 hours at 350–380° C. When the cooled mixture was distilled there was obtained 51 grams of silicon containing products boiling above 100° C.

A small sample of the product taken before distillation, was mixed with ether and hydrolyzed. A film of the ether solution was poured on a glass plate. Evaporation of the ether left a clear soft silicone film. When the film was heated at 120° C. for 4 hours, it became quite hard.

The next example describes the preparation of n-butylethyldichlorosilane from n-butyldichlorosilane and ethylene.

*Example 11.*—One-quarter of a mole of n-butyldichlorosilane was placed in the bomb. Ethylene was introduced until the pressure at room temperature remained constant at 575 lbs. per square inch. The bomb was shaken for 7½ hours at a temperature of 300° C. After cooling the bomb there was obtained 38 grams of liquid. Fractionation of the mixture gave 12 grams of n-butylethyldichlorosilane. The rest of the material was mainly higher boiling. B. P. of n-butylethyldichlorosilane 169–170° C.

*Analytical data*

Neutral equivalent calc.: 93. Found: 94.
Molecular weight calc.: 185. Found: 185.

The next example describes the action of ethylene on tributylsilane.

*Example 12.*—One-tenth of a mole of tri-n-butylsilane was placed in the bomb in an atmosphere of nitrogen. Ethylene was introduced until the pressure at room temperature remained constant at 800 lbs. per square inch. The bomb was shaken for 2–3 hours at a temperature of 320–340° C. When the apparatus had cooled to room temperature, the pressure was 700 lbs. per square inch. There was obtained from the bomb 28 grams of liquid. On fractionation, this liquid was found to include a mixture containing tri-n-butylhexyl silane, tri-n-butyl octyl silane and tri-n-butyl decyl silane, having a boiling point range of 285–305° C. at 760 mm. The molecular weight found was 317.

The next example describes the action of ethylene on a mixture containing silane, monochlorosilane, dichlorosilane, trichlorosilane and tetrachlorosilane.

*Example 13.*—The air in the bomb was replaced with nitrogen and the bomb was charged with a mixture of silane, monochlorosilane, dichlorosilane, trichlorosilane and tetrachlorosilane. Ethylene was introduced until the pressure at room temperature remained constant at 800 lbs. per square inch. The mixture was then shaken for six and one-half hours at 320–325° C. When the bomb was cooled to room temperature, a pressure drop of 375 lbs. per square inch was noted. Ethylene was again introduced until the pressure remained at 725 lbs. per square inch. The mixture was shaken for six hours at 320–340° C. After cooling the bomb the pressure guage indicated a drop of 375 lbs. per square inch. Ethylene was again introduced until a constant pressure of 700 lbs. per square inch was obtained. The bomb was shaken for six hours at 320–330° C. When the bomb was cooled a pressure drop of 300 lbs. per square inch was noted. The total pressure drop over a period of 18½ hours was 1050 lbs. per square inch.

When the bomb had cooled, there was obtained from it, 33 grams of a mixture of silicon compounds. The mixture was complex and could not be readily separated into its component parts by fractional distillation. Fractions were obtained with the following boiling ranges:

1. 55–60° C.
2. 60–90° C.
3. 90–150° C.
4. 165–210° C.
5. 120–150° C. at 18 mm.
6. 150–200° C. at 18 mm. Liquid residue.

All fractions contained silicon and chlorine. Fractions 3–6 inclusive contained the following amounts of chlorine. Average molecular weights and neutral equivalents are also listed.

|   | Percent Cl | Ave. M. W. | Neut. Eq. |
| --- | --- | --- | --- |
| 3 | 20.3 | 129 | 174 |
| 4 | 12.3 | 194 | 286 |
| 5 | 10.3 | 197 | 344 |
| 6 | 8.8 | 238 | 403 |

The relationship of the neutral equivalent to the molecular weight indicates the presence of non-chlorine containing components of each fraction such as hydrocarbon derivatives of silane $SiH_4$.

Benzene solutions of the fractions (obtained from molecular weight determinations) were hydrolyzed and the benzene solutions separated from the water layers. After evaporation of the benzene, products were obtained with the following characteristics.

3. Soft, sticky, white solid.
4. Very soft, clear brown solid.
5 and 6. Clear, brown, moderately viscous liquids.

On burning, each fraction left a deposit of silica.

*Example 14.*—Into a pressure reactor, there was charged a solution of 34 parts (0.5 mole) pentine-1 in 34 parts (0.25 mole) trichlorosilane (silicochloroform). The reactor was sealed and heated to 310° C. and shaken for 4 hours at 310–325° C. It was then cooled to room temperature and opened to yield a brown turbid solution. A small portion of this material was dissolved in ether and hydrolyzed with cold water to give a clear bluefluorescing ether solution of a silicol. A portion of the solution was poured on a watch glass and the ether evaporated off leaving the sticky silicol mixture which cured to a clear tough film in 4 hours at 120° C. Another film on glass air-dried in 3 days at room temperature to a tough flexible film.

Fractional distillation of 50 parts by weight of the original brown turbid solution obtained in the above reaction, yielded the following fractions on distillation through 3 cm. column packed with 1/8 inch glass helices:

I. 6.5 parts of 43–134° C.
II. 7.5 parts of 155–172° C.
III. 4.3 parts of 175–208° C.
IV. 4.6 parts of 96–158° C. at 5 mm. pressure.
V. 2.0 parts of 169–176° C. at 6 mm. pressure.
VI. Dark viscous residue.

From fraction II above there was isolated by fractional distillation 5 parts of 1-pentenyl trichlorosilane boiling at 168–171° C. The cryoscopic molecular weight was 188; calc. 203.5.

The neutralization equivalent of fraction VI, the complex residue of alkyl silicon chloride polymers, was 151.

All fractions, except fraction VI, were clear, colorless, unsaturated fuming liquids showing high bromine adsorption.

*Example 15.*—Into the pressure reaction was charged 20.6 parts (0.25 mole) hexine-1 and 34 parts (0.25 mole) trichlorosilane. The reactor was sealed and heated with shaking at 300° C. for 3¾ hours. On cooling the bomb, there was obtained 48 parts of brownish fuming liquid with a green fluorescence. Hydrolysis of an ether solution of a portion of this material was poured on a watch glass and cured 2 hours at 120° C. to yield a hard silicone film. A film could also be air dried in 3 days at room temperature.

Fractional distillation of the reaction product from the bomb yielded the following fractions:

I. 2.4 parts of 50–60° C. at 3 mm.
II. 8.2 parts of 60–70° C. at 3 mm. (mainly 65° C. at 3 mm.).
III. 3.5 parts of 125–140° C. at 3 mm.
IV. 3.5 parts of 145–170° C. at 3 mm.
V. Viscous dark residue.

Fraction II analyzed as 1-hexenyltrichlorosilane, or the addition compound of one molecule of trichlorosilane and one molecule of hexine-1.

*$C_6H_{11}SiCl_3$ analysis*

Neutralization equivalent—Found: 74.5, 74.7, 74.7. Calc.: 72.6.
Molecular weight—Found: 230. Calc.: 218.

Analysis of fraction III showed it to correspond to the addition product of two molecules of hexine-1 to one of trichlorosilane.

*$C_{12}H_{21}SiCl_3$ analysis*

Neutralization equivalent—Found: 88.8, 88.9. Calc.: 99.1.

Neutralization equivalent of fraction IV was found to be 109.

All fractions, except fraction V, were clear colorless fuming liquids possessing unsaturation, evidenced by high bromine adsorption.

*Example 16.*—Into a clear fused quartz vessel was placed 6.8 g. (0.1 mole) pentine-1 and 13.4 g. (0.1 mole) trichlorosilane. A short thermometer, to indicate internal temperature, was placed in the vessel which was then sealed closed. An ultraviolet-radiating mercury arc lamp was then placed close to the quartz reaction vessel so that its rays irradiated the contents while its heat held the reaction mixture at the desired temperature. Ultraviolet irradiation was carried out for 92 hours at 85–95° C. The quartz vessel was then cooled and opened. Fractional distillation of the product yielded 1-pentenyl trichlorosilane, boiling at 165–171° C., corresponding to the similar material obtained in Example 14.

*Analysis $C_5H_9SiCl_3$*

Neutralization equivalent—Found: 69. Calc.: 68.

In Example 12 above which illustrates the hydrocarbon-substituted non-halogen containing silane having an Si–H group, in lieu of the latter other alkyl or aryl substituted silanes containing no halogen may be used, amounts equivalent to the tri-butyl silane being used. Or any of such monovalent hydrocarbon substituent containing silanes having an Si–H group may be used in admixture with or without the halogen containing silanes, halosilanes containing halogen only attached to silicon, halosilanes containing hydrogen and halogen only attached to silicon, halosilanes containing hydrogen, halogen, and monovalent hydrocarbon groups only attached to silicon; substituted silanes containing hydrogen and monovalent hydrocarbon groups only attached to silicon; the amounts of such mixtures being equivalent to the tributyl silane in the example. In lieu of ethylene in such reactions other olefins, acetylene or substituted acetylenes may be employed in amounts equivalent to the ethylene of Example 12, and adjusting temperature and pressure as desired.

Example 13 above particularly illustrates the use of mixed silanes. In that example other olefines, acetylene, or substituted acetylenes may be used in amounts equivalent to the ethylene; or equivalent amounts of the non-halogen containing silanes having an Si–H group may be substituted for the mixture of silicon containing compounds in Example 13, or of such silanes in admixture with halogen containing silanes, halosilanes containing halogen only attached to silicon, halosilanes containing hydrogen and halogen only attached to silicon, halosilanes containing hydrogen, halogen and monovalent hydrocarbon groups only attached to silicon; substituted silanes containing hydrogen and monovalent hydrocarbon groups only attached to silicon; all with such temperature and pressure adjustment as desired.

Having thus set forth our invention, we claim:

1. The method of making hydrocarbon substituted silanes which comprises reacting a silane containing at least one Si–H group and all other valences attached to silicon being satisfied by a radical selected from the group consisting of hydrogen, monovalent hydrocarbon groups and a silicon containing radical in which latter the silicon valences are all satisfied by a radical selected from the group consisting of hydrogen and monovalent hydrocarbon groups, with an unsaturated aliphatic compound.

2. The method as in claim 1 in which the unsaturated compound is an olefine.

3. The method as in claim 2 in which a silane containing hydrogen only attached to silicon is a reactant.

4. The method as in claim 2 in which a silane containing H and alkyl groups attached to silicon is a reactant.

5. The method as in claim 1 in which the silane contains hydrogen only attached to silicon.

6. The method as in claim 1 in which the silane contains H and alkyl groups attached to silicon.

7. The method as in claim 1 in which the unsaturated compound is an acetylene.

8. The method as in claim 7 in which a silane containing hydrogen only attached to silicon is a reactant.

9. The method as in claim 7 in which a silane containing H and alkyl groups attached to silicon is a reactant.

10. The method as in claim 1 in which the silane is used in admixture with a halogen containing silane.

11. The method as in claim 10 in which the unsaturated compound is an olefine.

12. The method as in claim 10 in which the unsaturated compound is an olefine and a silane containing hydrogen only is present as a reactant.

13. The method as in claim 1 in which the silane is used in admixture with a halosilane containing only hydrogen, halogen and silicon atoms as a reactant.

14. The method as in claim 1 in which the silane is used in admixture with a substituted silane containing only hydrogen, monovalent hydrocarbon radicals and silicon atoms as a reactant.

15. The method as in claim 10 in which the unsaturated compound is an olefine and a halosilane containing only hydrogen, halogen, monovalent hydrocarbon radicals and silicon atoms is present as a reactant.

16. The method as in claim 10 in which the unsaturated compound is an olefine and a silane containing halogen only is present as a reactant.

17. The method as in claim 1 in which the silane is used in admixture with a halogen containing silane, and the unsaturated compound is an acetylene.

18. The method as in claim 17 in which a silane containing hydrogen only is present as a reactant.

19. The method as in claim 17 in which the silane is used in admixture with a halosilane containing only hydrogen, halogen and silicon atoms as a reactant.

20. The method as in claim 17 in which the silane is used in admixture with a substituted silane containing only hydrogen, monovalent hydrocarbon radicals and silicon atoms as a reactant.

21. The method as in claim 17 in which the unsaturated compound is an olefine and a halosilane containing only hydrogen, halogen, monovalent hydrocarbon radicals and silicon atoms is present as a reactant.

22. The method as in claim 17 in which the unsaturated compound is an olefine and a silane containing halogen only is present as a reactant.

23. The method as in claim 1 carried out in the absence of a catalyst.

24. The method of claim 23 in which the unsaturated compound is an olefine.

25. The method of claim 23 in which the unsaturated compound is an acetylene.

26. The method as in claim 1 in which the silane is used in admixture with a halogen containing silane to give a reaction product containing a hydrolyzable halogen group and the process includes the step of hydrolyzing said reaction product containing said hydrolyzable halogen group.

27. The method of claim 26 in which the unsaturated compound is an olefine.

28. The method of claim 26 in which the unsaturated compound is an acetylene.

29. The method as in claim 1 in which the silane is used in admixture with a halosilane containing only hydrogen, halogen and silicon atoms as a reactant to produce a product containing hydrolyzable halogen, and hydrolyzing said hydrolyzable halogen.

30. The method of claim 29 in which the unsaturated compound is an olefine.

31. The method of claim 29 in which the unsaturated compound is an acetylene.

32. The method as in claim 1 in which the silane is used in admixture with a halosilane containing only hydrogen, halogen, monovalent hydrocarbon radicals and silicon atoms as a reactant to produce a product containing hydrolyzable halogen, and hydrolyzing said hydrolyzable halogen.

33. The method of claim 32 in which the unsaturated compound is an olefine.

34. The method of claim 32 in which the unsaturated compound is an acetylene.

35. The method as in claim 1 in which the silane is used in admixture with a halosilane containing halogen only is present as a reactant to produce a product containing hydrolyzable halogen, and hydrolyzing said hydrolyzable halogen.

36. The method of claim 35 in which the unsaturated compound is an olefine.

37. The method of claim 35 in which the unsaturated compound is an acetylene.

38. The method of making organo silicon compounds which comprises heating in the absence of a catalyst a silicon compound having at least one hydrogen attached to the silicon and having the formula $R^1R^2R^3SiH$ in which $R^1$, $R^2$ and $R^3$ are selected from the group consisting of hydrogen, halogen, and alkyl with an unsaturated organic compound containing a double bond selected from the group consisting of olefines and diolefines to form an addition compound at a temperature of from 250 to 380° C. in a closed system for not more than eight hours to produce a liquid reaction product containing a complex mixture of organo silicon addition products including radicals which are multiples of a saturated group produced from the unsaturated group of the unsaturated organic compound, and recovering the organo silicon addition products including the stated multiple radicals, in which the heating is carried out under pressure in at least two separate stages with introduction of unsaturated compound before each heating stage, with a mixture of silane and chlorsilanes.

39. The method of making an alkyl silane which comprises reacting monosilane with an olefin having one ethylenic double bond and containing from two to five carbon atoms.

40. The process of making ethyl silane which comprises reacting under heat monosilane with ethylene.

41. The process which comprises reacting under heat monosilane with ethylene.

References Cited in the file of this patent

UNITED STATES PATENTS 2,537,763  Hurd _____ Jan. 9, 1951

FOREIGN PATENTS 961,878  France _____ Nov. 28, 1949